United States Patent Office 3,635,882
Patented Jan. 18, 1972

3,635,882
STABILIZED OXYMETHYLENE POLYMERS
Leon Starr, Plainfield, David Jon Runyon, Brick Township, Ocean County, and Albert T. Mills, Somerville, N.J., assignors to Celanese Corporation, New York, N.Y.
No Drawing. Filed Sept. 15, 1969, Ser. No. 858,147
Int. Cl. C08g 51/56, 51/58, 51/60
U.S. Cl. 260—45.9 P
7 Claims

ABSTRACT OF THE DISCLOSURE

Oxymethylene polymers are stabilized by a novel stabilizer which comprises a phosphine or phosphine oxide, an oxymethylene polymer antioxidant and metal oxide. This unique stabilizer need only be used in very limited quantities to impart a synergistic improvement in thermal stability. A preferred composition comprises (A) a tertiary phosphine oxide, (B) a phenolic antioxidant, and (C) an alkaline earth metal oxide. On molding these novel compositions, there are no mold deposits.

BACKGROUND OF THE INVENTION (1) Field of the invention

This invention relates to oxymethylene polymers. More particularly it relates to stabilization of moldable oxymethylene polymers by a novel stabilizing system which does not leave mold deposits upon molding.

The term oxymethylene polymer as used herein is meant to include oxymethylene homopolymers and diethers and diesters. Also included are oxymethylene copolymers, which includes oxymethylene polymers having at least 60 percent recurring oxymethylene units and at least one other unit derived from a monomer copolymerizable with the source of the oxymethylene units. Among the copolymers which are utilized in accordance with this aspect of the invention are those having a structure comprising recurring units having the formula

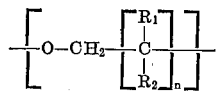

wherein each $R_1$ and $R_2$ is selected from the group consisting of hydrogen, lower alkyl and lower halogen substituted alkyl radicals and wherein $n$ is an integer from zero to 5 and wherein $n$ is zero in from 60 to 99.6 percent of the recurring units.

A preferred class of copolymers are those having a structure comprising recurring units having the formula (—O—CH$_2$—(CH$_2$O)$_n$—) wherein $n$ is an integer from zero to 2 and wherein $n$ is zero in from 60 to 99.6 percent of the recurring units. These copolymers are prepared by copolymerizing trioxane with a cyclic ether having the structure

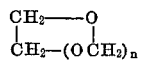

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

(2) Description of the prior art

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

While these high molecular weight oxymethylene polymers are relatively thermally stable, various treatments have been proposed to increase the polymers utility by increasing its thermal stability. Among these are end capping of hemiformal groups of polyoxymethylene homopolymers and hydrolysis to remove unstable groups of oxymethylene in copolymers containing interspersed stable units, such as ethoxy groups.

Even beyond these treatments, it has been found necessary to incorporate various stabilizers, antioxidants and chain-scission inhibitors into the polymers. Among the most successful and widely used thermal stabilizers are nitrogen containing compounds. These have been found very effective in lowering the thermal degradation rate of the polymer. However, two problems do arise which make these systems somewhat undesirable for commercial applications. First, there is the amine-like of "fishy" odor encountered during and after molding and second and even more important is the formation of mold deposits which appear to be polymeric in nature. This latter problem is of particular importance when small or narrow molded parts are being produced. Necessary mold cleanings are difficult and results in much lost time.

Accordingly, it is an object of our invention to devise a stabilizer system which will effectively reduce the thermal degradation rate of an oxymethylene polymer.

It is another object of our invention to prepare an oxymethylene polymer composition which will not emit an objectionable odor upon molding.

It is a further object of our invention to provide a thermally stable, non-odor forming oxymethylene polymer composition which will not leave mold deposits in the mold when these compositions are molded.

SUMMARY OF THE INVENTION

We have found that a particular stabilizing system comprising a phosphine compound or a tertiary phosphine oxide, an oxymethylene polymer antioxidant and metal oxide when incorporated into an oxymethylene polymer provide a composition of improved thermal stability, does not emit objectionable odors and when the composition is molded does not leave behind mold deposits. Preferably, the oxymethylene polymer composition comprises an oxymethylene polymer having admixed therein a minor proportion each of (A) a tertiary phosphine oxide, (B) an alkylene bisphenol antioxidant, and (C) an alkaline earth metal oxide such as MgO.

The combination of the phosphine compound, oxymethylene polymer antioxidant and alkaline earth metal oxide imparts to the oxymethylene polymer improved thermal stability, which improved stability is substantially greater than the additive effect of the individual components comprising our stabilizer combination, and substantially greater than the combination of any two of the individual components. Hence, the combination of stabilizers of our invention is certainly what is termed in the art a "synergistic" combination.

DESCRIPTION OF THE PREFERRED EMBODIMENTS

The preferred component (A) of our stabilizer system is a tertiary phosphine oxide and can be represented by the formula

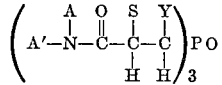

wherein A represents H, lower alkyl or phenyl, A' stands for H or lower alkyl, Z is H or $CH_3$, and Y represents H, $CH_3$ or phenyl. These tertiary phosphine oxides can be produced by reacting an $\alpha,\beta$-unsaturated amide with elemental phosphorus and a base, in the presence of water as disclosed in U.S. Pat. 3,067,251.

Representative tertiary phosphine oxides are tris-(2-carbamoylethyl) phosphine oxide; tris-(N-ethyl-2-carbamoylethyl) phosphine oxide; tris-(N-t-butyl-2-carbamoylethyl) phosphine oxide; and tris-(N-butyl-2-carbamoylethyl) phosphine oxide. Other phosphine oxides than the tris-(2-carbamoylethyl) phosphine oxides are effective, such as, tris-(2-cyanoethyl) phosphine oxide.

Component (A) of our stabilizer system may also be a phosphine compound and can be represented by the formula:

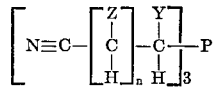

wherein $n$ represents an integer of the value of from 1 to 3, inclusive; Z is hydrogen or methyl, and Y represents hydrogen, methyl or phenyl.

Representative of the phosphine compounds is tris-(2-cyanoethyl) phosphine which can be represented by the following formula:

$$(N{\equiv}C{-}CH_2{-}CH_2)_3P$$

Also such compounds as (4-cyano-n-butyl) phosphine, tris-(3-cyano-n-propyl) phosphine, tris-(1-phenyl - 2 - cyanoethyl) phosphine, tris-(1-phenyl - 2,3 - dimethyl-2-cyano-n-propyl) phosphine, tris-(1-phenyl - 2 - methylcyanoethyl) phosphine, tris-(2,3-dimethyl - 2 - cyano-n-propyl) phosphine, tris-(2-methyl - 2 - cyanoethyl) phosphine and the like are effective.

Component (B) of the stabilizer system is an oxymethylene polymer antioxidant. Suitable antioxidants are alkylene bisphenols, thiobisphenols, polyhydroxyphenols and amines.

Preferably the antioxidant is an alkylene bisphenol. A suitable class of alkylene bisphenols includes compounds having from 1 to 4 carbon atoms in the alkylene group and having up to 2 alkyl substituents on each benzene ring, each alkyl substituent having from 1 to 4 carbon atoms. The preferred alkylene bisphenols are: 1,2-bis-(2-hydroxy - 4 - methyl-6-t-butyl-phenyl) ethane; bis-(2-hydroxy-4-methyl - 6 - t - butyl-phenyl) methane; 1,1-bis-(3-methyl-4-hydroxy - 6 - t - butyl-pheny) ethane; and 1,1-bis-(3-methyl-4-hydroxy - 6 - t - butyl-phenyl)-n-butane. Suitable phenolic stabilizers other than alkylene bisphenols include 2,6-ditertiary-butyl - 4 - methyl phenol, p-octyl phenol and p-phenyl phenol.

Component (C) is a basic metal oxide. The metals are those selected from the alkaline earth metals and when their oxides are placed in water, yield a pH above 7. Typical of these oxides are; calcium oxide, magnesium oxide, barium oxide and aluminum oxide.

The components of the stabilizer system are incorporated into the oxymethylene polymer in the following amounts. All percentages given below are weight percent, based upon the weight of the polymer.

The alkylene bisphenol is admixed in amounts not exceeding 5 weight percent and preferably from about 0.01 to about 1 weight percent, most preferably from 0.3 to about 1 weight percent, based upon the weight of the oxymethylene polymer.

The tertiary phosphine oxide or phosphine should be present from about 0.005 to about 0.5 weight percent, based on the weight of the polymer, preferably, from 0.01 to 0.05 weight percent. Good stability is obtained when more than 0.05 weight percent is used, but under certain molding conditions, anything above 0.1 weight percent will exude from the molded article. The exudate, however, is a white flaky non-polymeric material. It is the phosphine oxide, which is easily removed from the mold by wiping and is not to be confused with the nitrogenous mold deposits of the prior art system which are polymeric in nature and difficult to remove.

The basic metal oxide should be present at from about 0.05 to about 0.5 weight percent and preferably from 0.05 to about 0.25 weight percent based upon the weight of the oxymethylene polymer.

The thermal degradation rate of the polymer ($K_{D230}$) is measured by determining the percent weight loss of a sample of the polymer heated in an open vessel in a circulating air oven at 230° C. For example, the $K_{D230}$ of an unstabilized oxymethylene copolymer of trioxane and ethylene oxide, which was subjected to hydrolysis to remove unstable end groups, is well over 1 percent per minute and generally results in a complete loss after 45 minutes at 230° C.

The $K_{D230}$ of a composition containing a hydrolyzed copolymer and having incorporated therein a tertiary phosphine oxide, such as tris-(2-carbamoylethyl) phosphine oxide, is the same or greater than a polymer without the tertiary phosphine oxide. By incorporating an oxymethylene polymer antioxidant into the polymer alone, $K_{D230}$ values of about 1.1 to 1.2 weight percent loss per minute are obtained but results as low as 0.7 weight percent have been obtained an occasion. By incorporating only a basic metal oxide (e.g. magnesium oxide) into the polymer above, $K_{D230}$ values of about 0.40 to 0.70 weight percent loss per minute are obtained but results as low as 0.31 weight percent have been obtained on occasion.

When the phosphine, the antioxidant and the basic metal oxide are admixed into the polymer, $K_{D230}$ values of below about 0.1 weight percent loss per minute can be readily obtained. Since this improved thermal stability is substantially greater than the additive effect of the individual components, we believe this clearly demonstrates the "synergistic" behavior of our new stabilizer system.

The stabilized oxymethylene polymer compositions of our invention are prepared by admixing the components of our stabilizer system with the unstabilized polymer in any suitable manner, whereby a substantially homogenous composition is obtained. For example, the stabilizer system comprising the tertiary phosphine oxide, the basic metal oxide and the alkylene bisphenol may be incorporated into the oxymethylene polymer by dissolving both the polymer and the stabilizer components in a common solvent and thereafter evaporating the solution to dryness. Alternatively, the stabilizer components may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers followed by extrusion or melt compounding or by milling the stabilizers into the polymer as the latter is worked on a rubber mill.

The stabilized oxymethylene polymer compositions also include if desired, plasticizers, pigments, lubricants and other stabilizers, e.g. stabilizers against degradation by ultraviolet light, e.g., 2,2'-dihydroxy-4,4'-dimethoxy-benzophenone; 2 - hydroxy-4-methoxy-benzophenone; 2-hydroxy-4-methoxy-4'-chloro-benzophenone, and the like, which can be incorporated in amounts of about 1% by weight, based upon the weight of the oxymethylene polymer.

In order that those skilled in the art may better understand how the present invention can be carried into effect, the following examples are given by way of illustration and not by way of limitation. All parts are weights and percentages are by weight based on the weight of the polymer unless otherwise stated.

Unless otherwise stated, the oxymethylene polymers used in the following examples are oxymethylene copolymer of trioxane and ethylene oxide which was prepared as described in Example I of U.S. Pat. 3,254,053 issued to G. Fisher, F. Brown and W. Heinz on May 31, 1966.

Catalyst residues in the polymer were deactivated with an amine as described in U.S. Pat. 2,989,509 issued to D. Hudgin and F. Berardinelli on June 20, 1961.

The polymer is then subjected to hydrolysis to remove unstable terminal units as described in U.S. Pat. 3,318,848 issued to C. Clarke on May 9, 1967.

EXAMPLE I

The thermal degradation rate of an hydroxylated trioxane-ethylene oxide copolymer containing 2.4 percent by weight ethoxy units was measured by placing a sample of the polymer in an open vessel in a circulating air oven at 230° C. There was a complete loss of product after 45 minutes, indicating the instability of the unstabilized polymer.

EXAMPLE II

The thermal degradation rate of the polymer of Example I, having incorporated therein 0.01 weight percent of tris-(2-carbamoylethyl) phosphine oxide; was measured by placing a sample of the polymer in an open vessel in a circulating air oven at 230° C. There was a complete loss of product after 45 minutes, indicating the instability of the oxymethylene polymer having incorporated therein a small amount of a phosphine oxide.

EXAMPLE III

To the polymer of Example I was added about 0.5 percent bis-(2-hydroxy-4-methyl-6-t-butyl - phenyl) methane by dry blending, followed by extrusion of the mixture. Dry blending was accomplished by simply shaking the additives, weighed to analytical balance accuracy, in a container larger enough to insure proper dispersion in the polymer flake. Extrusion was conducted on a Brabender Plasticorder with a roller type mixing head for about 7 minutes at 100 r.p.m. at 190° to 200° C.

The $K_{D230}$ of this composition was determined as above and found to be 1.13 percent weight loss per minute.

EXAMPLE IV

To the polymer of Example I was added 0.2 weight percent of magnesium oxide (MgO) by dry blending, followed by extrusion of the mixture. The dry blending and extrusion was conducted as hereinbefore set forth in Example III.

The $K_{D230}$ of this composition was determined as above and found to be 0.313 percent weight loss per minute.

EXAMPLES V–IX

The procedure of Example III was followed using the amounts of stabilizer as specified in Table I along with the results. The purpose of these examples is to demonstrate that if two of the three stabilizers are employed together in a polyoxymethylene composition no advantage is seen thus further demonstrating the synergistic effect of all three components taken together.

TABLE I

| Example | Polymer,[a] parts | Phosphine,[b] parts | Antioxidant, parts | Oxide parts | $K_d$[d] | 5½ hour[e] wt. loss |
|---|---|---|---|---|---|---|
| V | 100 | 0.01 | [c] 0.5 | | 0.065 | 65 |
| VI | 100 | 0.5 | [c] 0.5 | | 0.064 | [f] |
| VII | 100 | 0.01 | | 0.2 MgO | 0.260 | [f] |
| VIII | 100 | | [g] 0.3 | 0.1 MgO | 0.023 | 26 |
| IX | 100 | | [h] 0.3 | 0.1 MgO | 0.98 | 65 |

[a] Hydroxylated oxymethylene copolymer containing 2.4 percent by weight ethoxy units.
[b] Tris-(2-carbamoylethyl) phosphine oxide.
[c] Bis-(2-hydroxy-4-methyl-6-t-butyl-phenyl) methane.
[d] Percent weight loss per minute at 230° C. in a circulating air oven.
[e] Percent weight loss after 5½ hours at 230° C.
[f] Not tested.
[g] Irganox 1010—a high molecular weight hindered polyphenol sold by Geigy Chemical Corporation.
[h] Goodrite 3110X104—a trifunctional hindered phenolic antioxidant sold by B. F. Goodrich Chemical Company.

EXAMPLES X–XXV

The procedure of Example III was followed using the amounts of stabilizer as specified in Table II along with the results.

TABLE II

| Example | Polymer,[a] parts | Phosphine,[b] parts | Antioxidant,[c] parts | Oxide, parts | $K_d$[d] | 5½ hour[e] wt. loss |
|---|---|---|---|---|---|---|
| X | 100 | 0.1 | 0.5 | 0.1 MgO | 0.011 | 11 |
| XI | 100 | 0.05 | 0.5 | 0.1 MgO | 0.010 | 18 |
| XII | 100 | 0.03 | 0.5 | 0.1 MgO | 0.012 | 20 |
| XIII | 100 | 0.025 | 0.5 | 0.1 MgO | 0.011 | 8 |
| XIV | 100 | 0.01 | 0.5 | 0.1 MgO | 0.014 | 14 |
| XV | 100 | 0.005 | 0.5 | 0.1 MgO | 0.016 | 34 |
| XVI | 100 | 0.25 | 0.3 | 0.1 MgO | 0.015 | 17 |
| XVII | 100 | 0.2 | 0.3 | 0.1 MgO | 0.010 | 11 |
| XVIII | 100 | 0.15 | 0.3 | 0.1 MgO | 0.009 | 14 |
| XIX | 100 | 0.1 | 0.3 | 0.1 MgO | 0.010 | 18 |
| XX | 100 | 0.075 | 0.3 | 0.1 MgO | 0.012 | 14 |
| XXI | 100 | 0.05 | 0.3 | 0.1 MgO | 0.014 | 17 |
| XXII | 100 | 0.025 | 0.3 | 0.1 MgO | 0.012 | 18 |
| XXIII | 100 | 0.025 | 0.3 | 0.15 MgO | 0.012 | 20 |
| XXIV | 100 | 0.025 | 0.3 | 0.2 MgO | 0.013 | 21 |
| XXV | 100 | 0.01 | 0.5 | 0.2 MgO | 0.010 | 11 |

[a] Hydroxylated oxymethylene copolymer containing 2.4 percent by weight ethoxy units.
[b] Tris-(2-carbamoylethyl) phosphine oxide.
[c] Bis-(2-hydroxy-4-methyl-6-t-butyl-phenyl) methane.
[d] Percent weight loss per minute at 230° C. in a circulating air oven.

EXAMPLES XXVI–XL

The procedure of Example III was followed using various phosphine compounds in place of the tris-(2-carbamoylethyl) phosphine oxide of Examples X–XXV. The amounts used and the results obtained are set forth in Table III.

TABLE III

| Example | Polymer,[a] parts | Phosphine, parts | Antioxidant,[b] parts | Oxide, parts | $K_d$[c] | 5½ hour[d] wt. loss |
|---|---|---|---|---|---|---|
| XXVI | 100 | [e] 0.01 | 0.5 | 0.2 | 0.014 | 17 |
| XXVII | 100 | [e] 0.025 | 0.5 | 0.2 | 0.012 | 10 |
| XXVIII | 100 | [e] 0.05 | 0.5 | 0.2 | 0.010 | 9 |
| XXIX | 100 | [f] 0.01 | 0.5 | 0.2 | 0.023 | 37 |
| XXX | 100 | [f] 0.025 | 0.5 | 0.2 | 0.018 | 21 |
| XXXI | 100 | [f] 0.05 | 0.5 | 0.2 | 0.017 | 12 |
| XXXII | 100 | [g] 0.01 | 0.5 | 0.2 | 0.023 | 38 |
| XXXIII | 100 | [g] 0.025 | 0.5 | 0.2 | 0.014 | 20 |
| XXXIV | 100 | [g] 0.05 | 0.5 | 0.2 | 0.013 | 26 |
| XXXV | 100 | [h] 0.01 | 0.5 | 0.2 | 0.010 | 17 |
| XXXVI | 100 | [h] 0.025 | 0.5 | 0.2 | 0.010 | 21 |
| XXXVII | 100 | [h] 0.05 | 0.5 | 0.2 | 0.013 | 40 |
| XXXVIII | 100 | [i] 0.01 | 0.5 | 0.2 | 0.011 | 16 |
| XXXIX | 100 | [i] 0.025 | 0.5 | 0.2 | 0.010 | 16 |
| XL | 100 | [i] 0.05 | 0.5 | 0.2 | 0.011 | 9 |

[a] Hydroxylated oxymethylene copolymer containing 2.4 percent by weight ethoxy units.
[b] Bis-(2-hydroxy-4-methyl-6-t-butyl-phenyl) methane.
[c] Grams/minute weight loss at 230° C. in a circulating air oven.
[d] Percent weight loss after 5½ hours at 230° C.
[e] Tris-(N-ethyl-2-carbamoylethyl) phosphine oxide.
[f] Tris-(2-cyanoethyl) phosphine.
[g] Tris-(2-cyanoethyl) phosphine oxide.
[h] Tris-(N-t-butyl-2-carbamoylethyl) phosphine oxide.
[i] Tris-(N-butyl-2-carbamoylethyl) phosphine oxide.

EXAMPLES XLI–XLVII

The procedure of Example III was followed using various basic metal oxides. The amounts used and the results obtained are set forth in Table IV.

TABLE IV

| Example | Polymer,[a] parts | Phosphine,[b] parts | Antioxidant,[c] parts | Oxide, parts | $K_d$[d] |
|---|---|---|---|---|---|
| XLI | 100 | 0.1 | 0.5 | 0.05 BaO | 0.017 |
| XLII | 100 | 0.1 | 0.5 | 0.1 BaO | 0.007 |
| XLIII | 100 | 0.2 | 0.5 | 0.025 BaO | 0.024 |
| XLIV | 100 | 0.2 | 0.5 | 0.05 BaO | 0.050 |
| XLV | 100 | 0.2 | 0.5 | 0.05 MgO | 0.018 |
| XLVI | 100 | 0.2 | 0.5 | 0.05 Al₂O₃ | 0.041 |
| XLVII | 100 | 0.2 | 0.4 | 0.1 CaO | 0.010 |

[a] Hydroxylated oxymethylene copolymer containing 2.4 percent by weight ethoxy units.
[b] Tris-(2-carbamoylethyl) phosphine oxide.
[c] Bis-(2-hydroxy-4-methyl-6-t-butyl-phenyl) methane.
[d] Percent weight loss per minute at 230° C. in a circulating air oven.

EXAMPLES XLVIII–LI

The procedure of Example III was repeated using various oxymethylene antioxidants in place of the alkylene bisphenol shown above. The amounts used and the results are shown in Table V.

TABLE V

| Example | Polymer,[a] parts | Phosphine,[b] parts | Antioxidant, parts | Oxide, parts | $K_d$[c] | 5½ hour[d] wt. loss |
|---|---|---|---|---|---|---|
| XLVIII | 100 | 0.1 | [e] 0.3 | 0.1 MgO | 0.024 | 16 |
| IL | 100 | 0.05 | [e] 0.3 | 0.1 MgO | 0.028 | 18 |
| L | 100 | 0.1 | [f] 0.3 | 0.1 MgO | 0.023 | 26 |
| LI | 100 | 0.05 | [f] 0.3 | 0.1 MgO | 0.020 | 13 |

[a] Hydroxylated oxymethylene copolymer containing 2.4 percent by weight ethoxy units.
[b] Tris-(2-carbamoylethyl) phosphine oxide.
[c] Percent weight loss per minute at 230° C. in a circulating air oven.
[d] Percent weight loss after 5½ hours at 230° C.
[e] Irganox 1010—a high molecular weight hindred polyphenol sold by Geigy Chemical Corporation.
[f] Goodrite 3110X104—a trifunctional hindered phenolic antioxidant sold by B. F. Goodrich Chemical Company.

It is to be understood that the foregoing detailed description is given merely by way of illustration and that many other variations may be made therein without departing from the spirit of our invention as defined in the following claims.

What we claim is:

1. An oxymethylene polymer composition which comprises an oxymethylene polymer selected from the group consisting of an oxymethylene homopolymer and a copolymer thereof represented by the formula

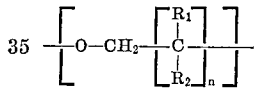

wherein $R_1$ and $R_2$ are each selected from the group consisting of hydrogen, lower alkyl and halogen-substituted lower alkyl radicals, $n$ is an integer of from zero to 5 and wherein $n$ is zero in from 60 to 99.6 percent of the recurring units, said polymers having incorporated therein a minor proportion of a stabilizer system comprising, (a) a tertiary phosphine oxide being represented by the formula:

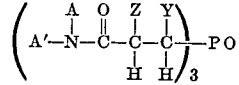

wherein A is selected from the group consisting of H, lower alkyl and phenyl, A' is selected from the group consisting of H and lower alkyl, Z is selected from the group consisting of H, $CH_3$ and phenyl, (b) a phenolic antioxidant for said oxymethylene polymer and (c) a metal oxide selected from the group consisting of an alkaline earth metal oxide and aluminum oxide.

2. The oxymethylene polymer composition of claim 1, wherein said tertiary phosphine oxide is present in amounts of from about 0.005 to about 0.5 weight percent, based on said oxymethylene polymer, said antioxidant is present in amounts of from 0.01 to about 1 weight percent, based on said oxymethylene polymer and said alkaline earth metal oxide is present in amounts of from about 0.05 to about 0.5 weight percent based upon said oxymethylene polymer.

3. The composition of claim 1 wherein said oxymethylene polymer is a copolymer.

4. The composition of claim 2 wherein said tertiary phosphine oxide is tris-(2-carbamoylethyl) phosphine oxide.

5. The composition of claim 2 wherein said antioxidant is an alkylene bisphenol.

6. The composition of claim 5 wherein said alkylene bisphenol is bis-(2 - hydroxy-4-methyl-6-t-butyl-phenyl) methane.

7. The composition of claim 2 wherein said alkaline earth metal oxide is magnesium oxide.

References Cited
UNITED STATES PATENTS

| | | | |
|---|---|---|---|
| 3,067,251 | 12/1962 | Rauhut et al. | 260—561 |
| 3,214,434 | 10/1965 | Grayson et al. | 260—465.8 |
| 3,475,479 | 10/1969 | Vullo | 260—465.8 |
| 3,532,668 | 10/1970 | Savides | 260—45.9 |

DONALD E. CZAJA, Primary Examiner

V. P. HOKE, Assistant Examiner

U.S. Cl. X.R.

260—37 A1, 45.7 R, 45.95